(12) United States Patent
Yeh et al.

(10) Patent No.: US 6,681,845 B1
(45) Date of Patent: Jan. 27, 2004

(54) RADIATING MODULE

(76) Inventors: Chia Ching Yeh, No. 287, Changhua Rd., Shinwu Shiang, Tao Yuan Hsien (TW); Lo Chi Huang, No. 185, Lane 75, Sec. 1, Dachang Rd., Lungtan Shiang, Tao Yuan Hsien (TW)

( * ) Notice: Subject to any disclaimer, the term of this patent is extended or adjusted under 35 U.S.C. 154(b) by 0 days.

(21) Appl. No.: 10/278,885

(22) Filed: Oct. 24, 2002

(51) Int. Cl.$^7$ ................................................ H05K 7/20
(52) U.S. Cl. ...................... 165/122; 165/80.3; 361/697
(58) Field of Search ............................... 165/80.3, 121, 165/122; 361/696, 697, 704, 710; 257/719, 722; 174/16.3

(56) References Cited

U.S. PATENT DOCUMENTS

| | | | | |
|---|---|---|---|---|
| 5,526,875 A | * | 6/1996 | Lin | 165/80.3 |
| 5,727,624 A | * | 3/1998 | Ko et al. | 165/121 |
| 5,940,269 A | * | 8/1999 | Ko et al. | 361/697 |
| 5,978,219 A | * | 11/1999 | Lin | 361/697 |
| 6,348,748 B1 | * | 2/2002 | Yamamoto | 310/62 |
| 6,439,299 B1 | * | 8/2002 | Miyahara et al. | 165/121 |
| 6,529,375 B2 | * | 3/2003 | Miyahara et al. | 361/697 |

* cited by examiner

*Primary Examiner*—Allen Flanigan

(57) ABSTRACT

A radiating module includes a base having an air exit in which airflow is converged and two sidewalls extending backward from two lateral ends of the air exit; a radiator mounted between the two sidewalls of the air exit; a cooling fan seat mounted below the base between the two sidewalls and behind the radiator and including a cooling fan for blowing air through the radiator toward the air exit; and a top cover closing a top of the base, so that a closed chamber is defined in the radiating module. The radiating module with the closed chamber enables airflow produced by the cooling fan to converge on the air exit and quickly carry heat absorbed by the radiator out of the radiator module.

3 Claims, 3 Drawing Sheets

RADIATING MODULE

BACKGROUND OF THE INVENTION

The present invention relates to a radiating module, and more particularly to a radiating module defining a closed room to enable airflow produced by a cooling fan in the module to converge on an air exit and thereby quickly carry heat absorbed by a radiator out of the radiating module.

While the computer technologies are prosperously developed, researches have also been made to develop various kinds of computer-related parts from a small screw to a complicate high-power central processing unit (CPU). It has become a common target of all manufacturers of computer-related products to upgrade product quality and reduce production costs, in order to remain competitive.

It is known that the CPU is a critical component of a computer. The high-power CPU processes data at such a high speed that people can use the computer in a manner much more convenient than ever before. However, heat generated by the high-speed CPU during its operation also increases the likelihood of burnout of the CPU.

The currently available CPU is very expensive. To facilitate testing of the expensive CPU, the CPU is usually plugged to an adapter welded to a printed circuit (PC) board beforehand, instead of being directly welded to the PC board. Meanwhile, for the CPU to uniformly dissipate the heat generated by it during operation in order to maintain it at a normal working temperature, it is a common practice to mount a radiator on a surface of the CPU. The radiator includes a base, a finned radiating portion, a cooling fan seat, and a cooling fan. The finned radiating portion is fixedly welded to the base with suitable tools, and the cooling fan seat having the cooling fan firmly screwed thereto is closed onto a surface of the finned radiating portion and is held there to by engaging fastening means provided on the cooling fan seat with that on the finned radiating portion. After the radiator has been assembled in the above-described manner, it is mounted above the CPU with a bottom side of the base applied with a layer of radiating agent facing toward the CPU and an upper side of the base bearing on a bottom of the finned radiating portion. Finally, the base is engaged with the adapter with fixing members to ensure a firm connection of the radiator to the adapter and effective removal of heat from the CPU to ambient environments.

While the conventional radiator having the above-described structure is effective in dissipating heat from the CPU, it has the following disadvantages:

1. The radiator has increased manufacturing cost because it takes a long time and a lot of labor to weld the finned radiating portion to the base with tools in order to assemble the radiator; and
2. The radiator with sequentially stacked base, finned radiating portion, and cooling fan does not meet the requirement of compactness for use with the constantly changing and volume-reduced computer host and CPU, such as in the case of a notebook computer that has a largely reduced thickness. A solution for this problem is using a thermal-conducting tube to connect the finned radiating portion to the cooling fan. However, the thermal-conducting tube increases material cost for the radiator and forms another waste of resource.

It is therefore desirably to develop a radiating module defining a closed room to overcome the disadvantages existed in the conventional radiator for CPU, so that airflow produced by a cooling fan could be converged on an air exit to quickly carry the absorbed heat out of the radiating module.

SUMMARY OF THE INVENTION.

A primary object of the present invention is to provide a radiating module that provides a closed chamber to converge airflows produced by a cooling fan thereof on an air exit to quickly carry heat absorbed by a radiator out of the radiating module.

To achieve the above and other objects, the radiating module of the present invention mainly includes a base having an air exit on which airflow converges and two sidewalls extended backward from two lateral ends of the air exit; a radiator mounted between the two sidewalls of the base close to the air exit; a cooling fan seat mounted below the base between the two sidewalls to locate behind the radiator and including a cooling fan for blowing airflow through the radiator toward the air exit; and a top cover closing a top of the base, so that a closed chamber is defined in the radiating module. The radiating module with the closed chamber enables airflows produced by the cooling fan to converge on the air exit and quickly carry heat absorbed by the radiator out of the radiator module.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
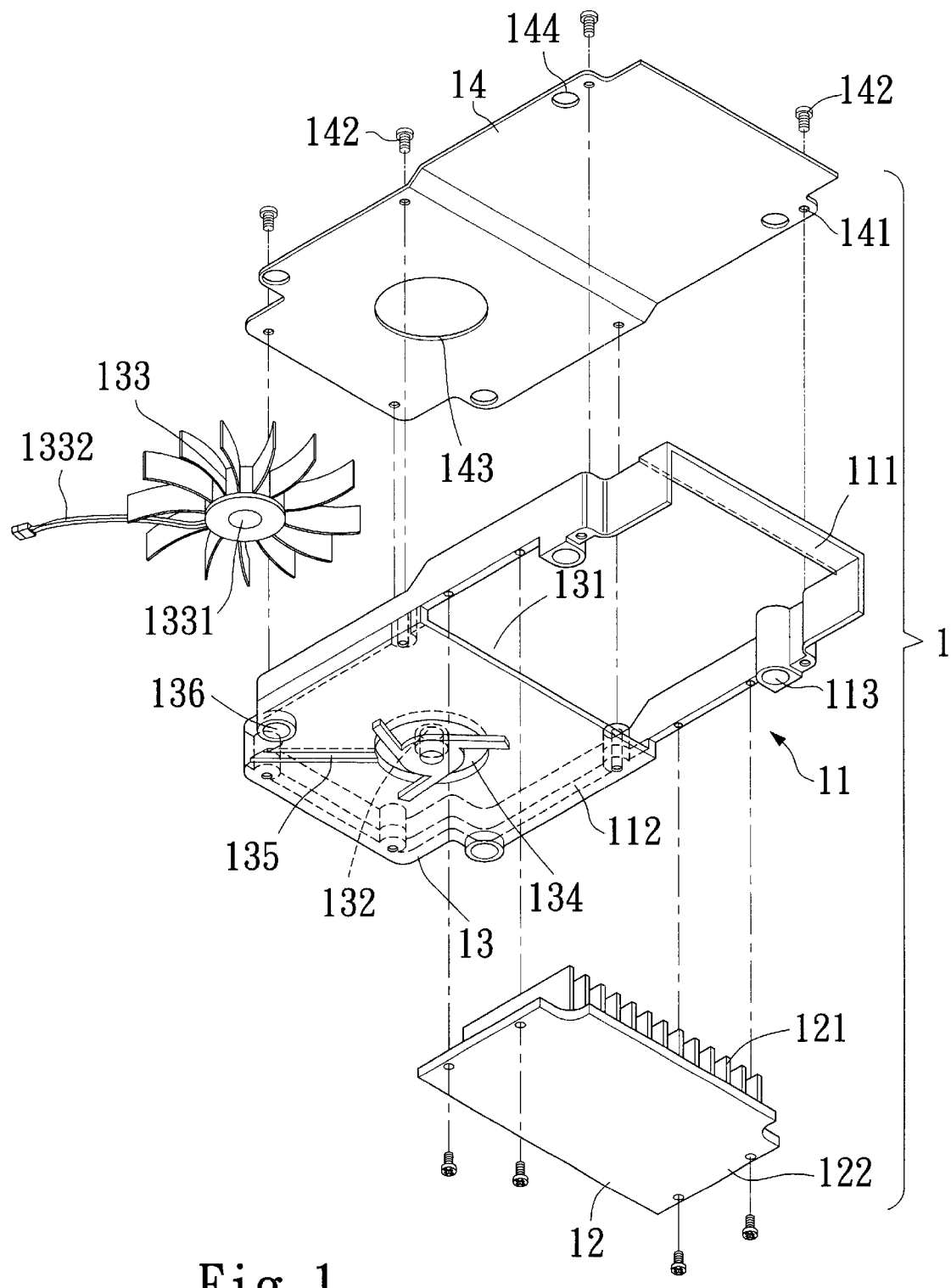
FIG. 1 is an exploded perspective bottom view of a radiating module according to the present invention.
Figure 2:
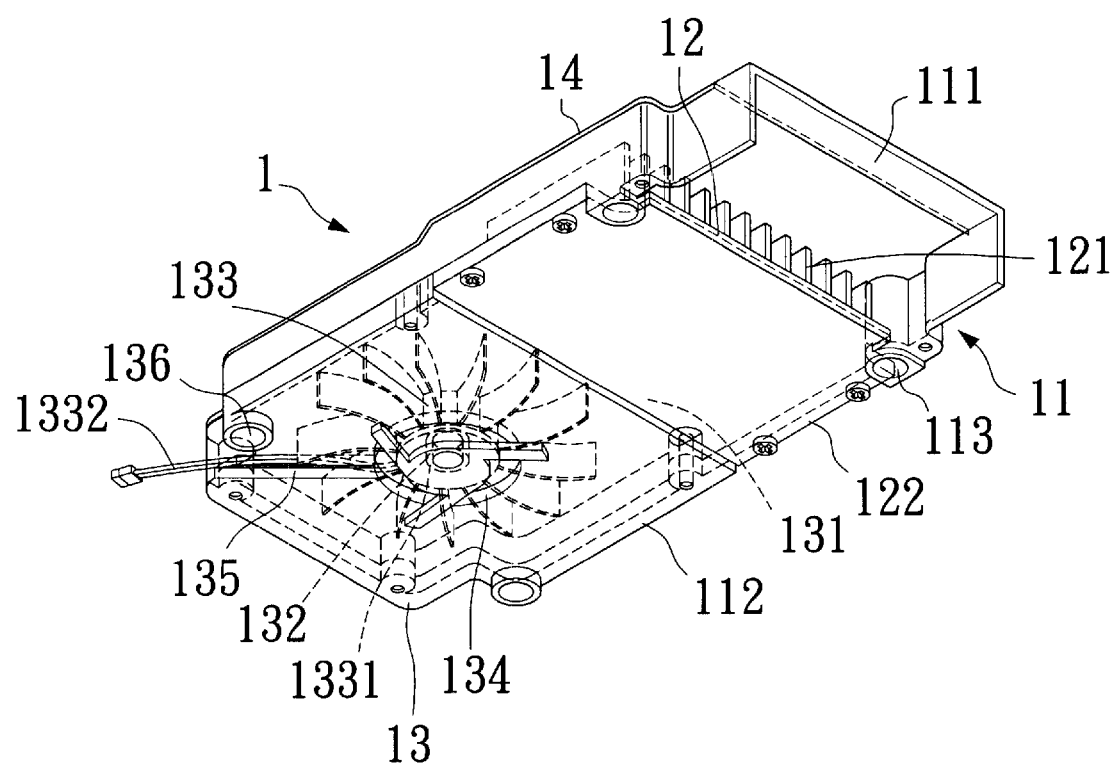
FIG. 2 is an assembled view of FIG. 1.

Please refer to FIGS. 1 and 2 that are exploded and assembled perspective bottom views, respectively, of a radiating module 1 according to an embodiment of the present invention. As shown, the radiating module 1 mainly includes a base 11, a radiator 12, a cooling fan seat 13, and a top cover 14.

The base 11 is formed at an end with an air exit 111 on where airflows produced at the cooling fan seat 13 are converged to move out of the radiating module 1. Two side walls 112 are backward extended from two lateral ends of the air exit 111. And, two through holes 113 having curved outer wall surfaces are separately provided near joints of the sidewalls 112 and the air exit 111 for fastening elements (not shown in FIGS. 1 and 2) to extend therethrough.

The radiator 12 is connected to the base 11 close to the end with the air exit 111 to locate between the two sidewalls 112. The radiator 12 is provided on an upper surface with a plurality of radiating fins 121, such that airflow-guiding ways formed between adjacent radiating fins 121 are oriented toward the air exit 111. The radiator 12 is also provided at two lower lateral ends with two outward extended wing portions 122 for abutting on lower edges of the two sidewalls 112 of the base 11.

The cooling fan seat 13 is provided at a lower side of the base 11 behind the radiator 12 to locate between the two sidewalls 112. As can be clearly seen from FIGS. 1 and 2, the cooling fan seat 13 defines a recess 131 enclosed by walls at only three sides with an open side facing toward the radiator 12. A short axle 132 is vertically downward extended from a bottom of the recess 131 for engaging with an axle hole 1331 of a cooling fan 133 that may be electromagnetically induced to rotate. An air inlet 134 is provided on the bottom of the recess 131 around the short axle 132. A wire groove 135 is provided on the bottom of the recess 131 to extend from the air inlet 134 to an outer edge of the cooling fan seat 13 for receiving a power cord 1332 of the cooling fan 133 therein. Two through holes 136 are correspondingly provided on the cooling fan seat 13 for fastening elements (not shown in FIGS. 1 and 2) to extend therethrough.

The top cover 14 is closed to a top of the base 11 and is provided with a plurality of mounting holes 141, 144, and an air inlet 143 corresponding to the air inlet 134 on the cooling fan seat 13. Screws 142 are extended through the mounting holes 141 to screw the top cover 14 to the base 11, the radiator 12, and the cooling fan seat 13 to form the radiating module 1 of the present invention. The radiating module 1 is then connected to a circuit board by extending fastening elements through the through holes 144 on the top cover 14 and the through holes 113, 136 provided on the base 11 and the cooling fan seat 13, respectively.

Figure 3:
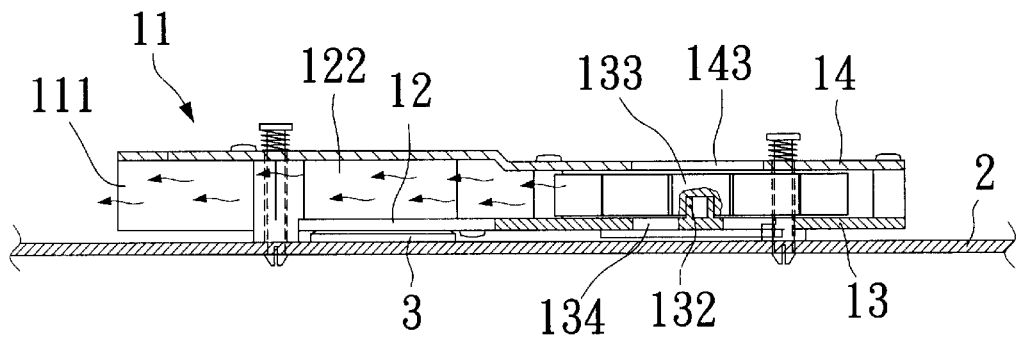
FIG. 3 is a sectioned side view of the radiating module according to a preferred embodiment of the present invention.
Figure 4:
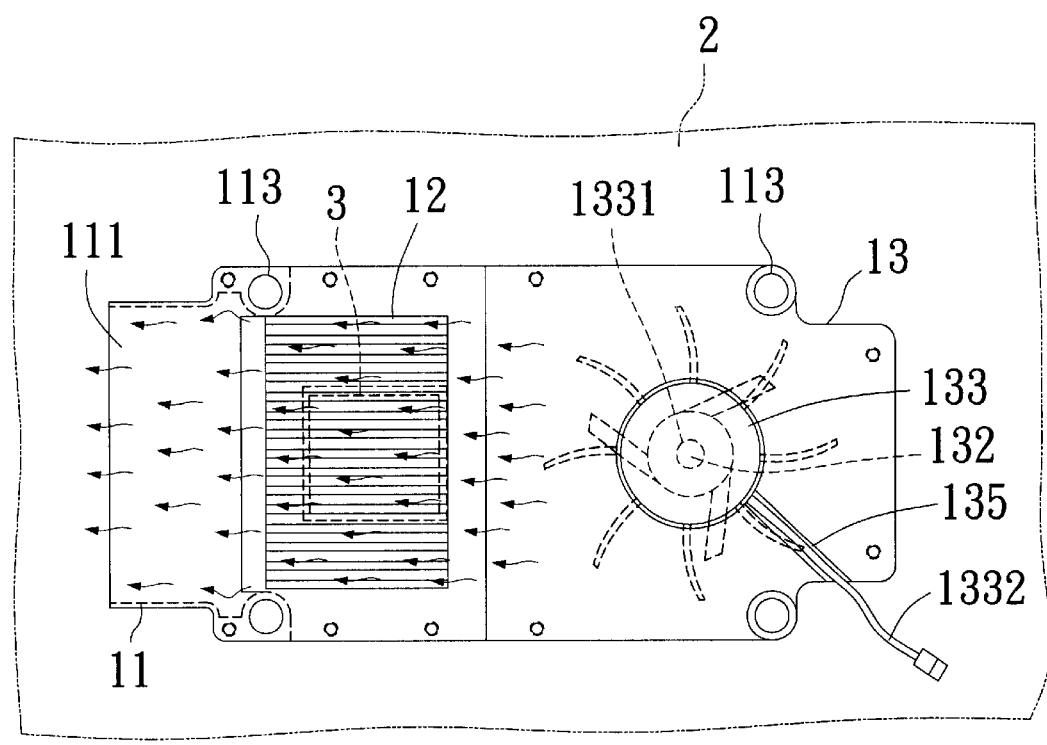
FIG. 4 is a plan view showing directions of airflows produced in the radiating module of the present invention.

Please refer to FIG. 3. Before the radiating module 1 of the present invention is connected to a printed circuit board (PCB) 2 to bear the bottom of the radiator 12 against a top surface of a central processing unit (CPU) 3 already mounted on the PCB 2, a layer of radiating agent is applied over the top surface of the CPU 3. Thereafter, fastening elements are extended through the holes 113 and 136 to firmly fix the radiating module 1 to the PCB 2. Whereby, when the cooling fan 133 is rotated to produce airflows, the airflows are converged on the open side of the recess 131 and blown toward the radiator 12 to pass through the airflow-guiding ways between the adjacent radiating fins 121, carrying heat absorbed by the radiating fins 121 out of the module via the air exit 111. The two through holes 113 having curved outer surfaces and located close to two lateral ends of the air exit 111 enable the airflows passing through the radiator 12 to impinge thereon to produce swirled flows before reaching at the air exit 111, so that the swirled and heat-absorbed airflows accelerate while moving out of the radiating module 1 via the air exit 111, as shown in FIG. 4. In brief, the radiating module 1 provides a closed chamber to converge the airflows produced the by the cooling fan 133 on the air exit 111 to quickly carry away heat absorbed by the radiator 12.

With the above-described arrangements, the radiating module 1 of the present invention provides at least the following advantages:

1. The radiating module 1 could be quickly mounted above the CPU on the PCB to save the complicate procedures of assembling and fixing the radiator 12 and the cooling fan 131.
2. The radiating module 1 enables the airflows produced by the cooling fan 131 to converge on the radiator 12 and to swirl before reaching at the air exit 111, so that hot airflows move out of the radiating module 1 at increased speed.

What is claimed is:

1. A radiating module, comprising a base, a radiator, a cooling fan seat, and a top cover;

said base being formed at an end with an air exit where airflow produced at said cooling fan seat converges to exit said radiating module, and having two lateral sidewalls which extended backward from two lateral ends of said air exit;

said radiator being connected to said base close to the end with said air exit and located between said two sidewalls; said radiator being provided on an upper surface with a plurality of radiating fins, such that airflow-guiding ways are formed between adjacent radiating fins oriented toward said air exit;

said cooling fan seat being provided at a lower side of said base behind said radiator and between said two sidewalls, and defining a recess enclosed by walls at only three sides with an open side facing toward said radiator; a short axle being vertically downwardly extended from a bottom of said recess for engaging with a cooling fan that may be electromagnetically induced to rotate, and an air inlet being provided on the bottom of said recess around said short axle; and said top cover being attached to a top of said base with an end connected to said air exit of said base and the other end covering said cooling fan seat;

whereby said radiating module in an assembled state defines a closed chamber for airflow produced by said cooling fan to converge on said air exit and quickly carry heat absorbed by said radiator out of said radiating module.

2. The radiating module as claimed in claim 1, wherein said base is provided near joints of said two sidewalls and said air exit with two through holes having curved outer wall surfaces for fastening elements to extend therethrough.

3. The radiating module as claimed in claim 1, wherein said radiator is provided at two lower lateral ends with two outward extended wing portions for abutting on lower edges of said two sidewalls of said base when fixed to said base.

* * * * *